United States Patent

Hashimura et al.

[11] Patent Number: 6,166,862
[45] Date of Patent: Dec. 26, 2000

[54] DESIGNING METHOD OF ZOOM OPTICAL SYSTEM

[75] Inventors: Junji Hashimura, Sakai; Yuichiro Ori, Moriyama, both of Japan

[73] Assignee: Minolta Co., Ltd., Osaka, Japan

[21] Appl. No.: 09/099,276

[22] Filed: Jun. 18, 1998

[30] Foreign Application Priority Data

Jun. 18, 1997  [JP]  Japan ................................. 9-161548

[51] Int. Cl.$^7$ ............................. G02B 3/00; G02B 15/14
[52] U.S. Cl. ........................................ 359/652; 359/689
[58] Field of Search .................................. 359/652, 653, 359/654, 689, 690, 691, 692

[56] References Cited

U.S. PATENT DOCUMENTS

| | | | |
|---|---|---|---|
| 5,087,988 | 2/1992 | Nakayama | 359/689 |
| 5,196,962 | 3/1993 | Aoki | 359/686 |
| 5,325,235 | 6/1994 | Takashima et al. | 359/689 |
| 5,327,290 | 7/1994 | Fukushima et al. | 359/692 |
| 5,434,711 | 7/1995 | Tetsuya et al. | 359/689 |
| 5,559,638 | 9/1996 | Aoki et al. | 359/749 |
| 5,629,799 | 5/1997 | Maruyama et al. | 359/565 |
| 5,973,849 | 10/1999 | Hashimura | 359/654 |
| 6,014,265 | 1/2000 | Kato et al. | 359/686 |

OTHER PUBLICATIONS

"Optical Design Method Based on the Quasi–Equivalent Glass of the Radial GRIN Lens", Toshiyuki Nagaoka, Hirofumi Tsuchida and Kimiaki Yamamoto, *Optics*, vol. 21 (Nov., 1992), pp. 795–798.

"Design of a gradient–index photographic objective", Leland G. Atkinson et al, *Applied Optics*, vol. 21, No. 6, Mar. 15, 1982, pp. 993–998.

"Design, Fabrication and Evaluation of a Photographic Objective That Uses a Radial GRIN Lens", Toshiyuki Nagaoka et al, *Optical Review*, vol. 1, No. 2 (1994), pp. 262–265.

*Primary Examiner*—Ricky Mack
*Attorney, Agent, or Firm*—Sidley & Austin

[57] ABSTRACT

A designing method of a zoom optical system wherein each zoom unit is formed of one optical element has steps of: selecting a spherical system, a gradient index system or a diffractive optical system and at least one more system as systems constituting the degree of design freedom of each zoom unit, optimizing each zoom unit with respect to third-order aberrations and chromatic aberration; and using an optical solution obtained by said optimizing step as the design start data.

23 Claims, 7 Drawing Sheets

FIG. 13d
FNO=6.25
SPHERICAL ABERATION / SINE CONDITION

FIG. 13e
Y'=21.6
ASTIGMATISM

FIG. 13f
Y'=21.6
DISTORTION %

FIG. 13g
FNO=8.53
SPHERICAL ABERATION / SINE CONDITION

FIG. 13h
Y'=21.6
ASTIGMATISM

FIG. 13i
Y'=21.6
DISTORTION %

DESIGNING METHOD OF ZOOM OPTICAL SYSTEM

This application is based on the application No. 9-161548 filed in Japan, the contents of which is hereby incorporated by reference.

BACKGROUND OF THE INVENTION

1. Field of the Invention

The present invention relates to a designing method of a zoom optical system, and more specifically, to a designing method of a zoom optical system including a gradient index optical element and or a diffractive optical element.

2. Description of the Related Art

Conventionally, a multitude of proposals have been made to reduce the size of a zoom optical system by decreasing the number of optical elements such as lens elements. In recent years, since the manufacture of an optical surface having an aspherical configuration has become comparatively easy, it has been enabled to reduce the number of optical elements constituting a zoom optical system by using the aberration correcting capability of an aspherical surface (U.S. Pat. No. 5,327,290).

However, aberration correction through the use of an aspherical surface is not effective for correction of all the aberrations. For example, aspherical surfaces have no aberration correcting capability for correction of Petzval sum and chromatic aberration associated with curvature of field. For this reason, even if a number of aspherical surfaces are used, it is theoretically impossible to form each zoom unit of only one optical element while maintaining the optical performance of the zoom lens system.

On the other hand, a zoom optical system has recently been proposed which performs aberration correction by using a gradient index optical element {so-called gradient index lens (GRIN lens) element} and a diffractive optical element (DOE).

However, although it is known that the aberration correcting capabilities of the gradient index optical element and the diffractive optical element are extremely high, handling of these elements in designing is not easy and it is extremely difficult to apply them to a zoom optical system in a manner such that their advantages are completely capitalized on.

Examples of conventional optical designing methods of an optical system including a gradient index optical element include a designing method disclosed in Optical Design Method Based on the Quasi-Equivalent Glass of the Radial GRIN Lens, Toshiyuki NAGAOKA, Hirofumi TSUCHIDA and Kimiaki YAMAMOTO, Optics, Vol. 21 (November, 1992), pp. 795–798. This method enables knowledge of design of a homogeneous lens to be applied to design of a GRIN lens as it is by regarding the GRIN lens as homogeneous glass having an effective refractive index and an Abbe number equivalent to those of the GRIN lens. However, the designing method described in this document only teaches to facilitate handling of the GRIN lens in designing and does not discuss a designing method of a zoom optical system which effectively uses the aberration correcting capability of the GRIN lens.

Examples of conventional optical systems comprising a small number of elements and including a diffractive optical element include an optical system disclosed in U.S. Pat. No. 5,629,799. This optical system uses the dispersive characteristic of the diffractive optical element for chromatic aberration correction and realizes an achromat with a single lens element. However, this patent does not refer to a zoom optical system to which it is more difficult to apply the diffractive optical element, and does not discuss a designing method of a zoom optical system which effectively uses the aberration correcting capability of the diffractive optical element.

SUMMARY OF THE INVENTION

An object of the present invention is to provide an improved designing method of a zoom optical system.

Another object of the present invention is to provide a designing method of a zoom optical system which capitalizes on characteristics of an optical element such as a DOE and a GRIN lens element.

A still further object of the present invention is to provide a designing method of a compact zoom optical system comprising an extremely small number of elements compared with conventional zoom optical systems.

The above-mentioned objects are achieved by a designing method of a zoom optical system wherein each zoom unit is formed of one optical element by using a spherical system, a gradient index system or a diffractive optical system and at least one more system as systems constituting the degree of design freedom of each zoom unit, each zoom unit is optimized with respect to third-order aberrations and chromatic aberration, and the optical solution obtained by the optimization is used as the design start data.

Moreover, the above-mentioned objects are achieved by a designing method of a zoom optical system wherein each zoom unit is optimized so as to satisfy conditions shown below and the optical solution obtained by the optimization is used as the design start data.

$$PAC = BF(\lambda) - BF(d) = 0$$

where

PAC is the axial chromatic aberration, $BF(\lambda)$ is the back focal length of a zoom unit at each wavelength $\lambda$; and $BF(d)$ is the back focal length of the zoom unit at the d-line.

The invention itself, together with further objects and attendant advantages, will be understood by reference to the following detailed description taken in conjunction with the accompanying drawings.

BRIEF DESCRIPTION OF THE DRAWINGS

In the following description, like parts are designed by like reference numbers throughout the several drawings.

DETAILED DESCRIPTION OF THE PREFERRED EMBODIMENTS

Hereinafter, a designing method of a zoom optical system according to the present invention will be described with reference to the drawings. Here, a zoom lens system will be described as an example of the zoom optical system, and zoom units constituting a zoom lens system will be referred to as units.

Initial Design of Zoom Lens System Including GRIN Lens Element or Diffractive Optical Element In performing optical design (particularly, design of a zoom lens system), design start data which are a starting point of design are important. This is because the speed of design convergence and the like largely varies according to how the design start data are selected. As a designing method which appropriately selects the design start data, a method which optimizes third-order aberrations has conventionally been known. Moreover, for a zoom lens system, since it is desirable that third-order aberrations and chromatic aberration be within a predetermined range in each unit, a designing procedure is frequently used such that design of each ray aberration is performed by using as the design start data the values obtained by optimizing the values of the third-order aberrations and chromatic aberration.

Figure 1:
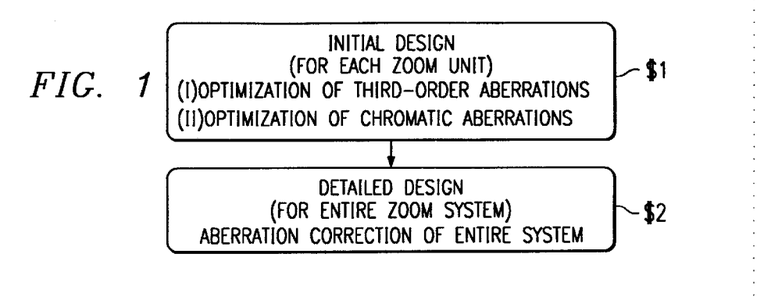
FIG. 1 is a flowchart showing a typical conventional designing procedure of a zoom lens system.

This designing procedure is shown in FIG. 1. An initial design ($1) is performed for each unit by use of the design start data, and a detailed design ($2) is performed for the entire zoom lens system with respect to focal length conditions [W], [M], and [T]. When a zoom lens system is designed by use of a designing technique according to the designing procedure (FIG. 1), the use of only homogeneous lens elements comprising only spherical systems places a limitation on reduction in the number of elements and in size of an optical system. As a result, the number of elements increases and the size of the optical system increases. To achieve large reduction in the number of elements and in size beyond the limitation, it is necessary to add some degree of design freedom to the optical system comprising only spherical systems.

The degree of design freedom in a spherical system includes the refractive index, the axial thickness and the curvatures of the front and rear surfaces of the lens element. Examples of systems other than a spherical system that constitute the degree of design freedom include an aspherical system, a diffractive optical system and a gradient index system. Assuming that one element which increases the degree of design freedom (for example, an aspherical surface or a diffractive surface) is one system constituting the degree of design freedom (for example, an aspherical system or a diffractive optical system), one aspherical system is formed of one aspherical surface, one diffractive optical system is formed of one diffractive surface, and one gradient index system is formed of one axial GRIN lens element or one radial GRIN lens element. The refractive index distribution of a radial GRIN lens is a refractive index distribution in a direction vertical to the lens optical axis, whereas the refractive index distribution of an axial GRIN lens is a refractive index distribution in a direction parallel to the lens optical axis. Table 1 shows contribution of each element to aberrations in the third-order range. In this table, ○ represents that the element contributes to correction of the aberration, whereas X represents that the element does not contribute.

TABLE 1

|  | Spherical Aberration | Coma Aberration | Astigmatism | Petzval | Distortion | Chromatic Aberration |
| --- | --- | --- | --- | --- | --- | --- |
| Aspherical surface | ○ | ○ | ○ | X | ○ | X |
| Diffractive surface | ○ | ○ | ○ | X | ○ | ○ |
| Axial GRIN Lens | ○ | ○ | ○ | X | ○ | X |
| Radial GRIN Lens | ○ | ○ | ○ | ○ | ○ | ○ |

Examples achieving size reduction by reducing the number of elements of a zoom lens system through the use of aspherical surfaces have conventionally been known. However, aspherical surfaces do not contribute to correction of Petzval sum and chromatic aberration (see Table 1). Therefore, at least two lens elements are necessary for each unit. On the contrary, a radial GRIN lens is effective in correction of both Petzval sum and chromatic aberration (see Table 1). Therefore, in order to reduce the number of elements so that each unit is formed of one optical element, it is desirable to use a radial GRIN lens as the optical element.

According to the zoom type, it is possible to correct Petzval sum of the entire system with balance among the units without correcting Petzval sum in each unit. In that case, a diffractive optical element which does not contribute to correction of Petzval sum but is effective in correction of chromatic aberration may be used. This is because in each unit, Petzval sum is not necessarily corrected although chromatic aberration is necessarily corrected.

In view of the number of limitation conditions (the focal length and aberrations to be corrected) necessary for obtaining the design start data of each unit and the number of degrees of design freedom (design variables) for correcting the limitation conditions, the degree of design freedom is insufficient merely by using a GRIN lens element or a diffractive optical element instead of a homogeneous lens element comprising only a spherical system. Specifically, the limitation conditions are the following six: the focal length (first-order amount) and the third-order aberrations (Seidel's five aberrations) of each unit, whereas when each unit includes, for example, one GRIN lens element comprising a spherical system, the design variables which contribute to the first order and the third order are the following six: the curvatures of the front and rear surfaces, the axial thickness, the axial refractive index, and the second-order and the fourth-order refractive index distribution coefficients of the GRIN lens element. Since the area where glass exists is limited, it is undesirable to use the axial refractive index as a design variable. Therefore, optimization is performed with the remaining five variables, so that the degree of design freedom is insufficient.

With respect to the diffractive surface, since consideration is performed for a zoom lens system for which it is unnecessary to consider correction of Petzval sum in each unit as mentioned above, the number of limitation conditions is reduced by one. The design variables that contribute to the third-order aberrations are the second-order and the fourth-order phase coefficients; however, since the second-order phase coefficient is used for chromatic aberration correction, the degree of design freedom is insufficient like in the above-described case of the GRIN lens element.

As described above, the degree of design freedom of third-order aberration correction is insufficient even if a gradient index system or a diffractive optical system is added to a spherical system, so that it is extremely difficult to form each unit of one optical element. According to a paper of the past {L. G. Atkinson, S. N. Houde-Walter, D. T. Moore, P. D. Ryan and J. M. Stagamann, "Design of a Gradient-index Photographic Objective", Appl. Opt. Vol. 21 (1982) pp. 993–998}, it is theoretically shown that it is impossible from an aberration correction viewpoint to form a fixed focal length lens system of one GRIN lens element comprising a spherical system.

Figure 2:
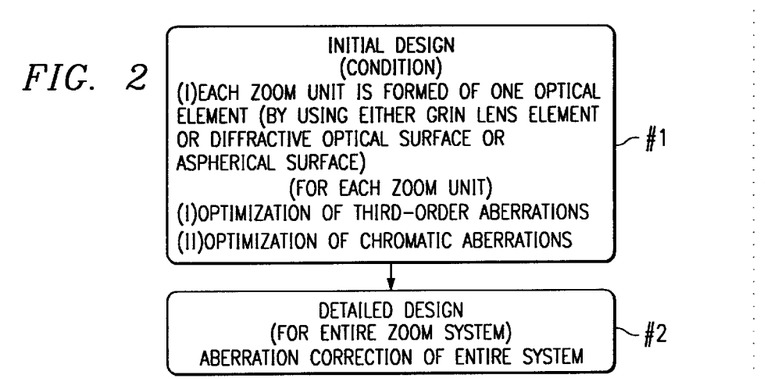
FIG. 2 is a flowchart showing a designing procedure of a zoom lens system according to the present invention.

A feature of the designing method according to the present invention is that each unit is formed of at least three systems by using a spherical system, a gradient index system or a diffractive optical system and at least one more system (for example, an aspherical system or a diffractive optical system) as systems constituting the degree of design freedom of each zoom unit. With this configuration, each unit can be formed of one optical element and size reduction of the entire system is achieved. Table 2 shows combinations of three systems constituting each unit formed of one optical element. When the construction of each unit is such that [a spherical system]+[a gradient index system or a diffractive optical system]+[a system constituting some degree of design freedom (for example, an aspherical system or a diffractive optical system)], like the above-described case (FIG. 1), design is performed in the procedure of [initial design (#1)] to [detailed design (#2)] as shown in FIG. 2.

TABLE 2

| No. | Combinations of three systems constituting each unit formed of one optical element | | |
|---|---|---|---|
| 1 | A spherical system | A gradient index system | An aspherical system (one surface) |
| 2 | A spherical system | A gradient index system | A diffractive optical system (one surface) |
| 3 | A spherical system | A diffractive optical system (one surface) | An aspherical system (one surface) |
| 4 | A spherical system | A diffractive optical system (one surface) | A diffractive optical system (one surface) |

[Definition of Radial GRIN Lens]

A radial GRIN lens is defined by the following expression (1):

$$N(r) = N_0 + N_1 \cdot r^2 + N_2 \cdot r^4 + N_3 \cdot r^6 + N_4 \cdot r^8 + \quad (1)$$

In the expression (1),
r is the distance (height) from the optical axis in a direction vertical to the optical axis,
$N_0$ is the axial refractive index, and
$N_i$ is the 2ith-order (the 2ith power of r, i=1, 2, 3, . . . ) refractive index distribution coefficient.

[Definition of Phase Function of Diffractive Surface]

The phase function of a diffractive surface is defined by the following expression (2):

$$\phi(r) = \frac{2\pi}{\lambda_0}(R_1 \cdot r^2 + R_2 \cdot r^4 + R_3 \cdot r^6 + \cdots) \quad (2)$$

In the expression (2),
φ is the phase function,
r is the height in the direction vertical to the optical axis,
$R_i$ is the ith phase coefficient, and
$\lambda_0$ is a design wavelength.

[Definition of Surface Configuration of Aspherical Surface]

The surface configuration of an aspherical surface is defined by the following expression (3):

$$x(r) = \frac{C \cdot r^2}{1 + \sqrt{1 - \varepsilon \cdot C^2 \cdot r^2}} + \sum_{i \geq 2} \setminus(\setminus\%\setminus)) A_i \cdot r^i \quad (3)$$

In the expression (3),
r is height in the direction vertical to the optical axis;
x(r) is deviation from the reference plane in the direction of the optical axis;
C is paraxial curvature;
ε is quadric surface parameter; and
$A_i$ is ith-order aspherical surface coefficient.

[Optimization of Third-order Aberrations]

Each unit is optimized with respect to the third-order aberrations so that each unit is formed of one optical element, and the optical solution obtained by the optimization is used as the design start data for the third-order aberration design. For the optimization of the third-order aberrations, Dr. Yamaji's theory related to the aberration coefficient of a zoom lens system is used {see Keizo Yamaji, "Research on Optical Design of Zoom Lens System", Canon Research Report No. 3 (1965)}. According to the paper of Dr. Yamaji's, the aberration coefficient of a zoom lens system is given by the following expression (4) using a characteristic matrix and a intrinsic coefficient:

$$S = \sum_i (\alpha_i \cdot S_{oi}) \quad (4)$$

Here, S is the aberration coefficient of the entire system at the focal length conditions [W], [M] and [T],
$\alpha_i$ is the characteristic matrix of each unit (ith unit) (i=1, 2, 3, . . . ), and
$S_{oi}$ is the intrinsic coefficient of each unit (ith unit) (i=1, 2, 3, . . . ).

As is apparent from the expression (4), the aberration coefficient of a zoom lens system is optimized by optimizing the intrinsic coefficient of each unit with respect to a zoom solution. That is, the aberration coefficient of the entire system can be minimized by optimizing the intrinsic coefficient of each unit. To do so, the target of the third-order aberration coefficient at each of the three focal length conditions (the wide-angle condition [W], the middle condition [M] and the telephoto condition [T]) is set, and the intrinsic coefficient which each unit should have with respect to the target is optimized to thereby obtain the target of the intrinsic coefficient. Then, each design variable is optimized based on the target of the intrinsic coefficient of each unit to thereby obtain the optimum solution of the intrinsic coefficient. Since the optimum solution of the third-order aberrations of each unit is obtained by performing scaling of the optimum solution of the intrinsic coefficient, the optimum solution of the third-order aberrations is used as the design start data for the third-order aberration design.

[Preferred Embodiments Performing Optimization of Third-order Aberrations]

Here, two embodiments each comprising four systems will be described. A first embodiment is the type No. 1 of Table 2 to which one aspherical system is added. Each unit comprises [a spherical system], [a gradient index system (a radial GRIN lens element)] and [an aspherical system (bi-aspherical surface)]. A second embodiment is the type No. 3 of Table 2 to which one aspherical system is added. Each unit comprises [a spherical system], [a diffractive optical system (single-side diffractive surface)] and [an aspherical system (bi-aspherical surface)]. A procedure of the third-order aberration optimization in the first embodiment is shown at steps S10 to S80 of FIG. 3. A procedure of the third-order aberration optimization in the second embodiment is shown at steps S10 to S80 of FIG. 4.

Figure 3:
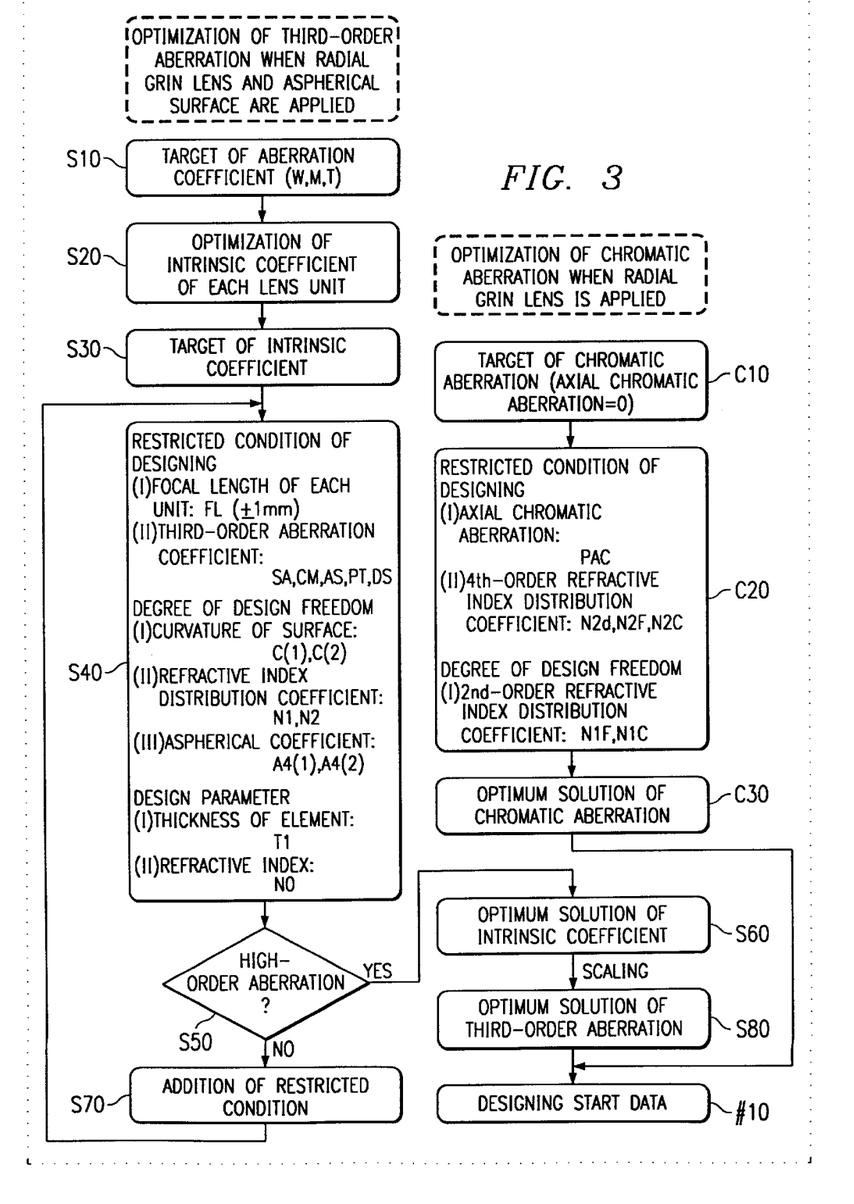
FIG. 3 is a flowchart showing a procedure of optimization of third-order aberrations and chromatic aberration in a first embodiment.
Figure 4:
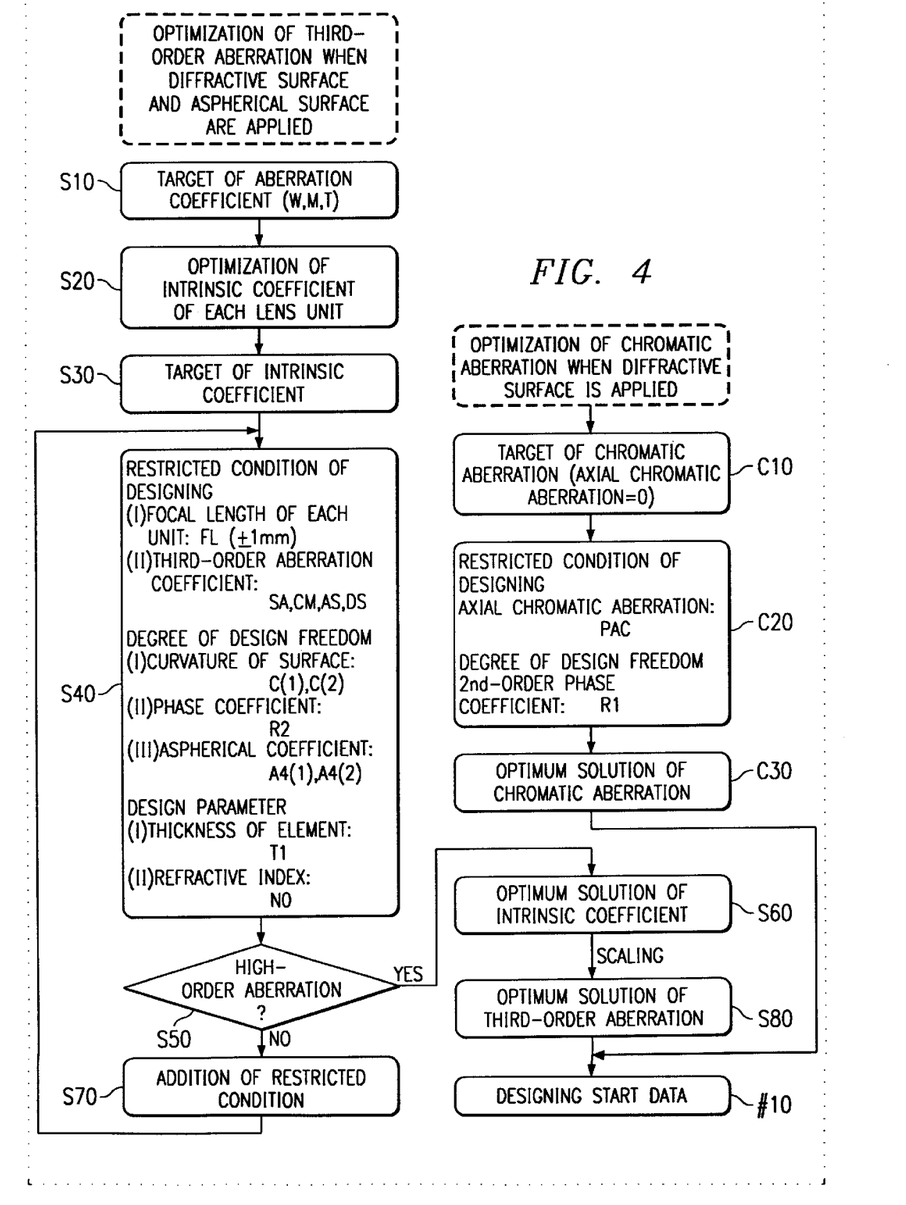
FIG. 4 is a flowchart showing a procedure of optimization of third-order aberrations and chromatic aberration in a second embodiment.

In the first and the second embodiments, each unit is formed of one optical element (one surface thereof will be referred to as the first surface and the other surface, as the second surface) and the third-order aberration optimization is performed for each unit (independently for each unit). First, in order to minimize the third-order aberration coefficient of the zoom lens system, the target of the aberration coefficient at each of the three focal length conditions [W], [M] and [T] is set (S10) and the intrinsic coefficient which each unit should have with respect to the target is optimized to thereby obtain the target of the intrinsic coefficient (S20 and S30). Then, each design variable is optimized based on the target of the intrinsic coefficient of each unit (S40) to thereby obtain the optimum solution of the intrinsic coefficient (S60).

In the first embodiment, the following six are adopted as the degree of design freedom (design variables) (S40 of FIG. 3):

the curvature of the first surface: C(1);

the curvature of the second surface: C(2):

the second-order refractive index distribution coefficient: N1;

the fourth-order refractive index distribution coefficient: N2;

the fourth-order aspherical coefficient of the first surface: A4(1); and the fourth-order aspherical coefficient of the second surface: A4(2).

The limitation conditions in the first embodiment are the following six (S40 of FIG. 3), where for calculation of the intrinsic coefficient, the focal length of each unit is FL=±1 mm (focal length adjustment is performed with C(2)):

the focal length FL; and third-order aberration coefficients (intrinsic coefficients) SA (spherical aberration), CM (coma aberration), AS (astigmatism), PT (Petzval sum) and DS (distortion).

Figure 5:
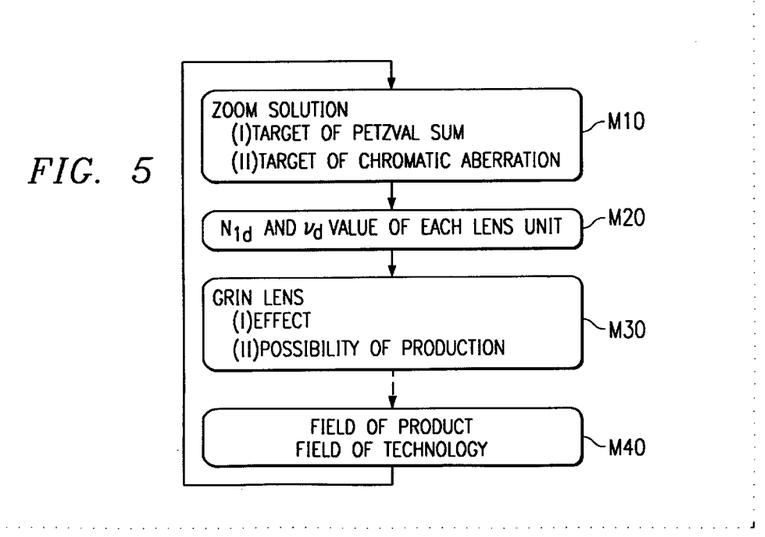
FIG. 5 is a flowchart of assistance in explaining a relationship between a zoom solution and a GRIN lens element.

In the second embodiment, the following five are adopted as the degree of design freedom (design variables) (S40 of FIG. 5):

the curvature of the first surface: C(1);

the curvature of the second surface: C(2):

the fourth-order phase coefficient of the diffractive surface: R2;

the fourth-order aspherical coefficient of the first surface: A4(1); and the fourth-order aspherical coefficient of the second surface: A4(2).

In the second embodiment, since it is unnecessary to consider PT, the limitation conditions thereof are the following five (S40 of FIG. 4), where for calculation of the intrinsic coefficient, the focal length of each unit is FL=±1 mm (focal length adjustment is performed with C(2)):

the focal length FL; and the third-order aberration coefficients (intrinsic coefficients) SA, CM, AS and DS.

In the first and the second embodiments, the axial thickness T1 and the refractive index N0 at the center of the optical axis are used as design parameters (S40 of FIGS. 3 and 4). A fixed value is given as each of the design parameters. This is because the area where glass exists and the size of the lens element are considered and it is intended to prevent the refractive index from existing in an area outside the area where glass exists and to prevent the axial thickness from increasing extremely. When the axial thickness T1 is excluded from the degree of design freedom in order to reduce the size along the diameter, it is necessary to complement the insufficiency. In the first and the second embodiments, in order to complement the insufficiency, the degree of design freedom is increased by adopting a bi-aspherical surface.

When each design variable is optimized with respect to the limitation conditions as described above, the construction of each unit is univocally decided from the target of the intrinsic coefficient. The solution can be obtained thereby because the number of limitation conditions and the number of degrees of design freedom are the same. However, in the first and the second embodiments, taking the possibility of higher-order aberration correction into consideration (S50), the limitation conditions are added to the obtained solution (lens construction and coefficients) to thereby perform the optimization again (S70 and S40), and the construction of each unit is repeatedly obtained to realize a desired construction. At this time, it is possible to change the design parameters in consideration of higher-order aberration correction.

When it is determined that there is possibility of higher-order aberration correction (S50), it is adopted as the optimum solution of the intrinsic coefficient (S60). Since the obtained optimum solution of the intrinsic coefficient is FL=±1 mm for the optimization, scaling of each unit is performed in order to apply this to an actual zoom lens system. By performing scaling of the optimum solution of the intrinsic coefficient, the optimum solution of the third-order aberration of each unit is obtained (S80) and the optical solution is used as the design start data for the third-order aberration design (#10).

[Optimization of Chromatic Aberration]

Optimization of chromatic aberration can be separately performed in parallel with the optimization of third-order aberrations. Specifically, in order that the axial chromatic aberration in each unit is zero, the refractive index distribution coefficient of each wavelength is optimized when the system is a gradient index system and the phase coefficient is optimized when the system is a diffractive optical system. As the design wavelength ξ0, the three wavelengths of the d-line, the F-line and the C-line are selected.

[Embodiment Performing Optimization of Chromatic Aberration]

Here, the first embodiment (FIG. 3) including a radial GRIN lens element as the gradient index system and the second embodiment (FIG. 4) including a diffractive surface as the diffractive optical system will be described. A procedure of chromatic aberration optimization in the first embodiment is shown at steps C10 to C30 of FIG. 3. A procedure of chromatic aberration optimization in the second embodiment is shown at steps C10 to C30 of FIG. 4.

In the chromatic aberration optimization, first, the target value of the axial chromatic aberration PAC in each unit is set at 0 (C10). That is, each unit is optimized so as to satisfy the following condition (5):

$$PAC \equiv BF(\lambda) - BF(d) = 0 \quad (5)$$

where

PAC is the axial chromatic aberration, $BF(\lambda)$ is the back focal length of the unit at each wavelength $\lambda$; and $BF(d)$ is the back focal length of the unit at the d-line.

In the first embodiment, only the second-order refractive index distribution coefficient of each wavelength is used as the design variable and the fourth-order refractive index distribution coefficient of each wavelength at that time is the same as the coefficient of the d-line (C20 of FIG. 3). In the second embodiment, the second-order phase coefficient is used as the design variable (C20 of FIG. 4). By performing chromatic aberration optimization by use of the design variables, the optimum solution of the chromatic aberration of each unit is obtained (C30) and the optical solution is used as the design start data of chromatic aberration design (#10).

[Chromatic Aberration Correction of Diffractive Surface]

The axial chromatic aberration PAC of a thin system is given by the following expression (6):

$$PAC \propto \frac{\phi_r}{\nu_r} + \frac{\phi_D}{\nu_D} \quad (6)$$

where $\phi_r$ is the optical power of a refractive lens element, $\phi_D$ is the optical power of a diffractive surface, $\nu_r$ is the Abbe number of the refractive lens element, $\nu_D$ is the Abbe number of the diffractive surface, and $\phi = \phi_r + \phi_D$ ($\phi$ is the optical power of a lens element).

$\phi_D$, $\nu_r$ and $\nu_D$ are represented by the following expressions (7) to (9):

$$\nu_r = \frac{N_d - 1}{N_F - N_C} \quad (7)$$

$$\nu_d = \frac{\lambda_d}{\lambda_F - \lambda_C} = -3.45 \quad (8)$$

$$\phi_D = -2mR_1 \quad (9)$$

where $N_d$ is the refractive index to the d-line, $N_F$ is the refractive index to the F-line, $N_C$ is the refractive index to the C-line, $\lambda_d$ is the wavelength of the d-line, $\lambda_F$ is the wavelength of the F-line, $\lambda_C$ is the wavelength of the C-line, and m is the diffraction degree.

As is apparent from the expression (8), a characteristic of the dispersion of a diffractive surface is that it is not dependent on the configuration. When chromatic aberration is corrected by only one diffractive surface, the optical power of the diffractive surface is so strong that higher-order aberration is apt to be generated and the pitch of the diffraction grating is too small, which is undesirable from a manufacture viewpoint. For this reason, it is desirable that both side surfaces of the lens element are diffractive surfaces so that the diffractive power is divided into two. This is desirable in performing design in consideration of higher-order aberration correction because the phase coefficient of one of the diffractive surfaces can be used as a degree of design freedom.

Designing Technique of GRIN Lens Element in Consideration of Manufacture

Here, with consideration given to manufacture of radial GRIN lens elements in the above-described initial designing technique of a zoom lens system, the designing technique will be described.

Relationship Between Zoom Solution and GRIN Len Element Necessary in Design

When the zoom solution is decided, the intrinsic coefficient which each unit should have is decided, and from the intrinsic coefficient, the degree of refractive index distribution which a GRIN lens element should have when each unit comprises only the GRIN lens element, and the direction of the relationship between the refractive index and the dispersion at that time are substantially univocally decided. From this, as described below, the GRIN lens element necessary for each zoom solution is mostly found before design is performed.

[Method of Deciding Second-order Refractive Index Distribution Coefficient N1 from Petzval Sum in GRIN Lens Element]

When the target of Petzval sum of a unit is decided, the second-order refractive index distribution coefficient Ni of the GRIN lens element which the unit should have is univocally decided. By approximating the unit by a thin system, the Petzval sum PT of a radial GRIN lens element is given by the following expression (10):

$$PT = \frac{\phi_s}{N_0} + \frac{\phi_m}{N_0^2} \quad (10)$$

where $N_0$ is the axial refractive index {see expression (1)}, $\phi_s$ is the optical power of the surface (optical power when it is assumed that the lens element is homogeneous), and $\phi_m$ is the optical power of the medium.

Since $\phi = \phi_s + \phi_m$, $\phi_s$ and $\phi_m$ are given by expressions (11) and (12) shown below. That is, from the optical power $\phi$ and the Petzval sum PT of the unit, $\phi_s$ and $\phi m$ are obtained with $N_0$ as a parameter. $\phi_m$ is represented by an expression (13). It is apparent that when PT is given with $T_1$ of the expression (13) and $N_0$ from $\phi_m$ of the expression (12) as parameters, $N_1$ is univocally decided (that is, whether the refractive index distribution is a divergent type or a convergent type).

$$\phi_s = \frac{N_0^2 \cdot PT - \phi}{N_0 - 1} \quad (11)$$

-continued $$\phi_m = \frac{N_0(N_0 \cdot PT - \phi)}{1 - N_0} \quad (12)$$

$$\phi_m = -2N_1 T_1 \quad (13)$$

[Handling of Chromatic Aberration of GRIN Lens Element]

The axial chromatic aberration of a thin system is represented by the following expression (14):

$$PAC \propto \frac{\phi_s}{v_{0d}} + \frac{\phi_m}{v_{1d}} \quad (14)$$

where $v_{0d}$ is called the homogeneous Abbe number and $v_{1d}$ is called the first radial GRIN Abbe number. They are represented by the following expressions (15) and (16), respectively:

$$v_{0d} = \frac{N_{0d} - 1}{N_{0F} - N_{0C}} \quad (15)$$

$$v_{1d} = \frac{N_{1d}}{N_{1F} - N_{1C}} \quad (16)$$

where $N_{0d}$ is the axial refractive index to the d-line, $N_{0F}$ is the axial refractive index to the F-line, $N_{0C}$ is the axial refractive index to the C-line, $N_{1d}$ is the second-order refractive index distribution coefficient to the d-line, $N_{1F}$ is the second-order refractive index distribution coefficient to the F-line, and $N_{1C}$ is the second-order refractive index distribution coefficient to the C-line.

Adopting a similar concept to that of the case of Petzval sum, $v_{0D}$ corresponds to the Abbe number when the lens element is homogeneous (the same definition as that of the dispersion of a homogeneous lens element) and $v_{1d}$ corresponds to the Abbe number of the medium of a GRIN lens element (dispersion caused because the medium is a GRIN lens element). From the sign of $v_{1d}$ of each unit, it is found whether the dispersion of the GRIN lens element is in a direction called positive dispersion or in a direction called negative dispersion. The direction called positive dispersion is a direction which obliquely ascends rightward on the map of the refractive index and the Abbe number. Generally, a GRIN lens element having dispersion in this direction is easier to make. The direction called negative dispersion is a direction which obliquely ascends leftward on the map of the refractive index and the Abbe number. A GRIN lens element having dispersion in this direction is very difficult to manufacture.

[Method of Estimating Dispersion of GRIN Lens Element from Target of Chromatic Aberration]

When chromatic aberration correction of a zoom lens system is considered, by deciding the target of chromatic aberration, the direction of dispersion which the GRIN lens element of each unit should have can be estimated from the target. A method of doing so will be described.

The axial chromatic aberration PAC is approximately defined by an expression (17) shown below. Modifying the expression (17), an expression (18) shown below is obtained.

$$PAC \equiv \frac{1}{\phi(\lambda)} - \frac{1}{\phi(d)} \quad (17)$$

$$PAC \equiv \frac{1}{\phi_s(\lambda) - 2T_1 N_{1\lambda}} - \frac{1}{\phi_s(d) - 2T_1 N_{1d}} \quad (18)$$

where $\phi(\lambda)$ is the optical power of the lens element at each wavelength $\lambda$, $\phi(d)$ is the optical power of the lens element at the d-line, $\phi_s(\lambda)$ is the optical power of the surface at each wavelength $\lambda$, $\phi_s(d)$ is the optical power of the surface at the d-line, and $N_{1\lambda}$ is the second-order refractive index distribution coefficient for each wavelength $\lambda$.

The terms of $\phi_s\{\phi_s(\lambda) \text{ and } \phi_s(d)\}$ are obtained from the target of the Petzval sum of each unit. Therefore, by obtaining $N_{1d}$ from the target of the Petzval sum in an early stage of the initial design, the value of $N_{1\lambda}$ therefor can be obtained from the target of axial chromatic aberration and the direction of dispersion which the unit should have can be easily estimated.

According to a method which sets the target of the axial chromatic aberration of each unit at 0, when PAC=0, each wavelength $N_{1\lambda}$ is given by an expression (19) shown below. The direction of dispersion is estimated by calculating $v_{1d}$ by use of $N_{1\lambda}$ obtained by the expression (19). Thus, estimation is very easily performed.

$$N_{1\lambda} = N_{1d} + \frac{\phi_d(\lambda) - \phi_s(d)}{2T_1} \quad (19)$$

[Relationship Between Zoom Solution and GRIN Lens Element]

In each unit of a zoom lens system, when the targets of Petzval sum and chromatic aberration are decided, the values of $N_{1d}$ and $v_{1d}$ required therefor are univocally obtained through approximation. Therefore, the refractive index distribution {how much $\Delta N$ (that is, the difference between the refractive index at the edge of a radial GRIN lens element and the axial refractive index thereof) is required} and the direction of dispersion are found before concrete detailed design is performed. Consequently, the degree of effect of the GRIN lens element for aberration correction and possibility of manufacture are estimated, so that a zoom lens system for which the use of a GRIN lens element is effective is theoretically found.

When a product is considered, in the flow shown in FIG. 5 (M10 to M40), the zoom solution used therefor is limited to some extent. The effect and possibility of a GRIN lens element in the zoom solution are estimated by the method described above. Consequently, a field for which the use of the GRIN lens element is effective and whether manufacture is possible or not are found.

Concept of GRIN Lens Element Design in Consideration of Manufacture

Figure 6:
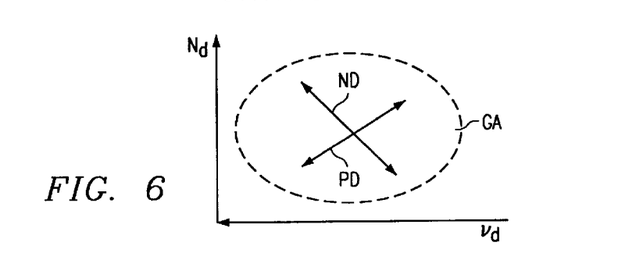
FIG. 6 is a view of assistance in explaining the direction of refractive index distribution of a GRIN lens element.

FIG. 6 shows directions of refractive index distribution of a GRIN lens element. Here, $N_d$ and $v_d$ represent the refractive index and the Abbe number to the d-line, respectively, GA is the area where glass exists, PD is a positive direction and ND is a negative direction (the same goes in the following). From the above-described analysis of the zoom solution and the GRIN lens element, the following two points (i) and (ii) are found with respect to the GRIN lens element used in each unit:

(i) In a case where Petzval sum is corrected with each unit being formed of one GRIN lens element, when the GRIN lens element is used in a positive unit, the refractive index distribution thereof is a convergent type (distribution such that the refractive index gradually decreases from the center of the optical axis to the edge of the lens element), and when the GRIN lens element is used in a negative unit, the refractive index distribution thereof is a divergent type (distribution such that the refractive index gradually increases from the center of the optical axis to the edge of the lens element).

(ii) In a case where chromatic aberration is corrected with each lens unit being formed of one GRIN lens element, when the GRIN lens element is used in a positive unit, the dispersion thereof is in a direction for dispersion to increase from the center of the optical axis to the edge of the lens element (direction for the Abbe number to decrease), and when the GRIN lens element is used in a negative unit, the dispersion is in a direction for dispersion to decrease from the center of the optical axis to the edge of the lens element (direction for the Abbe number to increase).

Figure 7:
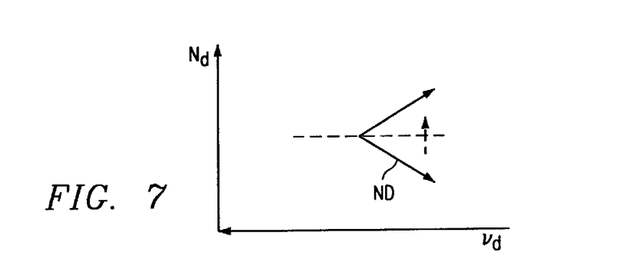
FIG. 7 is a view of assistance in explaining a method which changes the direction of refractive index distribution.
Figure 8:
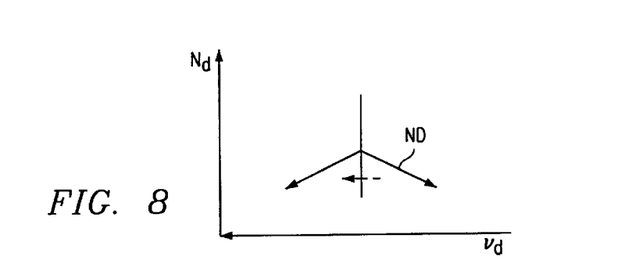
FIG. 8 is a view of assistance in explaining a method which changes to the direction of dispersion.

As is understood from the points (i) and (ii), in most zoom solutions, when a GRIN lens element is used, the direction of the refractive index distribution thereof is the negative dispersion direction. That is, in most cases, the GRIN lens element has a direction which is difficult to manufacture. Methods of changing this to a manufacturable refractive index distribution direction include the following methods (1) and (2):

1. a method which changes the direction of refractive index distribution (FIG. 7); and
2. a method which changes the direction of dispersion (FIG. 8).

The method 1 is a designing method in which, as shown in FIG. 7, in order to change the refractive index distribution direction of a GRIN lens element to a manufacturable direction, Petzval sum is generated in each unit to thereby correct Petzval sum in the entire zoom lens system. The method (2) is a designing method in which, as shown in FIG. 8, in order to change the refractive index distribution direction of a GRIN lens element to a manufacturable direction, chromatic aberration is generated in each unit to thereby correct chromatic aberration in the entire zoom lens system. However, the method (2) which generates chromatic aberration in each unit is next to impractical because it is necessary to search for a zoom solution such that chromatic aberration is corrected in the entire zoom lens system. Therefore, it is desirable to use the method (1) for changing the refractive index distribution direction of a GRIN lens element to a manufacturable direction.

[Method of Changing Refractive Index Distribution Direction of GRIN Lens Element to Manufacturable Direction]

Figure 9:
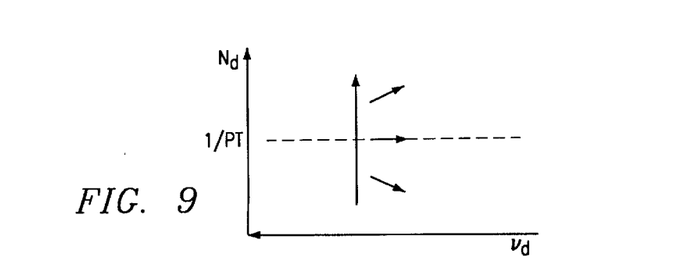
FIG. 9 is a view of assistance in explaining a method which controls the refractive index distribution direction of a GRIN lens element to change the refractive index distribution direction of the GRIN lens element to a manufacturable direction.

As an example of the method (1) which changes the direction of refractive index distribution, a method which controls the refractive index distribution direction of a GRIN lens element to change the refractive index distribution direction of the GRIN lens element to a manufacturable direction will be described with reference to FIG. 9. FIG. 9 shows the relationship between the refractive index and the direction of refractive index distribution on the optical axis of a GRIN lens element.

In the relationship between Petzval sum and the refractive index coefficient $N_1$ by thin system approximation, as is apparent from the expression (13), the sign of $N_1$ depends on whether $\phi_m$ is a positive value or a negative value. Since at least $N_0 > 0$ and $1 - N_0 < 0$ in the expression (12), the sign of $\phi_m$ depends on the sign of $N_0 \cdot PT - \phi$. Since the optical power $\phi$ of a unit is standardized to $|\phi|=1$ in the optimization of the intrinsic coefficient of the unit, this is applied here and consideration is separately given to a case where the optical power of the unit is positive and a case where it is negative.

$$\phi_m = \frac{N_0(N_0 \cdot PT - \phi)}{1 - N_0} \tag{12}$$

$$\phi_m = -2N_1 T_1 \tag{13}$$

(in the case of $\phi > 0$)

Since the direction of dispersion from the center of the optical axis to the edge of the lens element is a rightward direction on the map of the refractive index and the Abbe number, in order that the GRIN lens element is a positive lens element, it is necessary that $\phi_m < 0$. Therefore, satisfying an expression (20) shown below is a condition for the GRIN lens element to be a positive lens element. In the case of a positive lens element, the value of PT is generally positive. Therefore, satisfying a condition (21) shown below is a requirement.

$$N_0 PT - 1 > 0 \tag{20}$$

$$N_0 > \frac{1}{PT} \tag{21}$$

(in the case of $\phi < 0$)

Since the direction of dispersion from the center of the optical axis to the edge of the lens element is a leftward direction on the map of the refractive index and the Abbe number, in order that the GRIN lens element is a positive lens element, it is necessary that $\phi_m > 0$. Therefore, satisfying an expression (22) shown below is a condition for the GRIN lens element to be a positive lens element. In the case of a negative lens element, PT is generally a negative value. Therefore, satisfying a condition (23) shown below is a requirement.

$$N_0 PT + 1 < 0 \tag{22}$$

$$N_0 > -\frac{1}{PT} \tag{23}$$

As is understood from the above, the refractive index distribution direction of a GRIN lens element can be changed to the positive direction by selecting a refractive index $N_0$ which is higher than $1/|PT|$. This will be called "1/PT rule" and the refractive index ($N0=1/|PT|$) at the boundary where the sign of $N_1$ changes will be called "critical refractive index". According to the 1/PT rule, a refractive index distribution direction where possibility of manufacture of a GRIN lens element is high can be realized. However, it is desirable to perform handling and design with the critical refractive index obtained here as an index.

Figure 10:
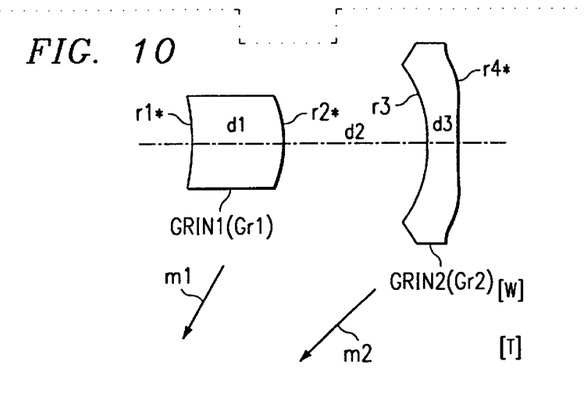
FIG. 10 is a lens construction view of a first example.
Figure 11:
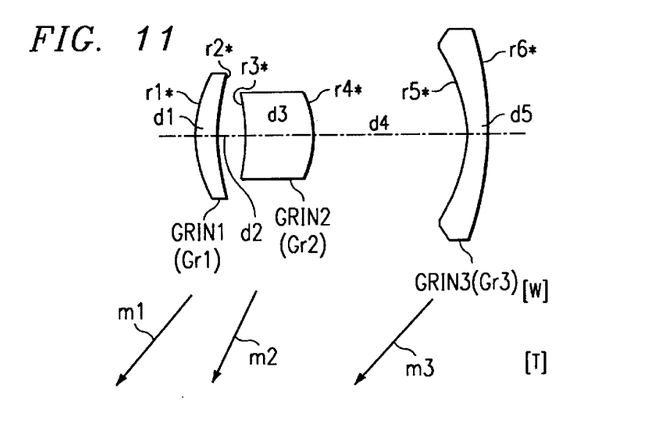
FIG. 11 is a lens construction view of a second example.
Figure 12A:
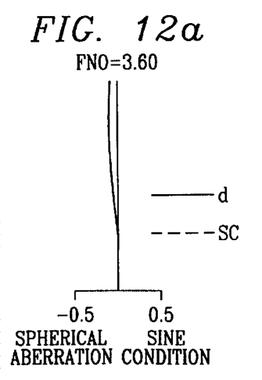
FIGS. 12a to 12i are graphic representations of aberrations of the first example.
Figure 12B:
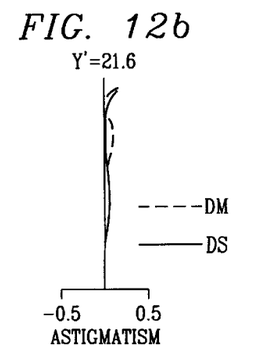
Figure 12C:
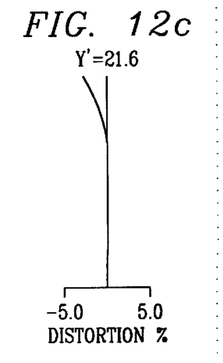
Figure 12D:
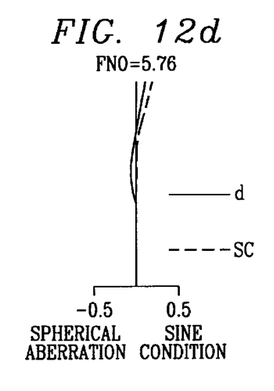
Figure 12E:
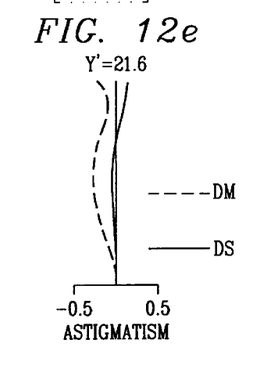
Figure 12F:
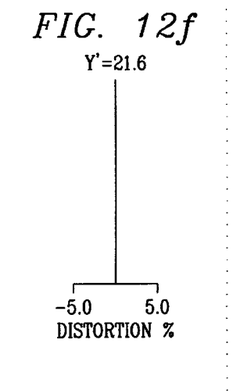
Figure 12G:
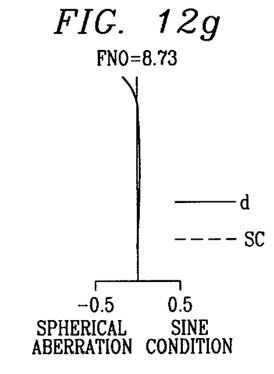
Figure 12H:
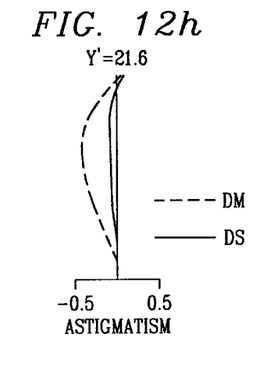
Figure 12I:
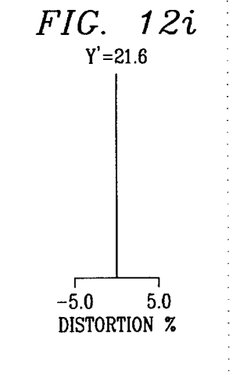
Figure 13A:
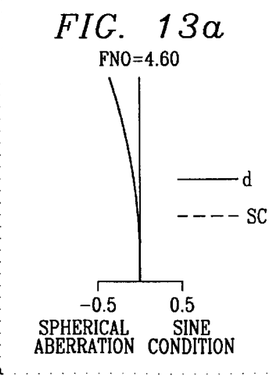
FIGS. 13a to 13i are graphic representations of aberrations of the second examples.
Figure 13B:
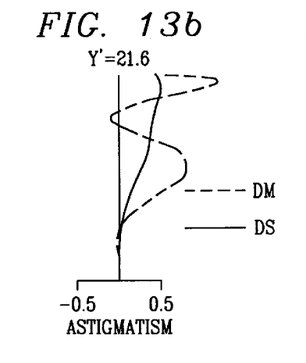
Figure 13C:
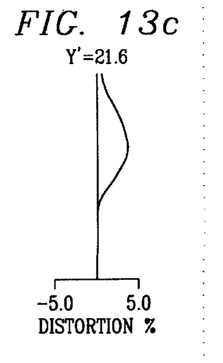
Figure 13D:
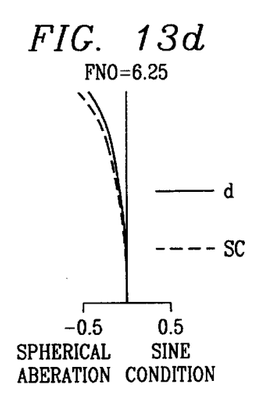
Figure 13E:
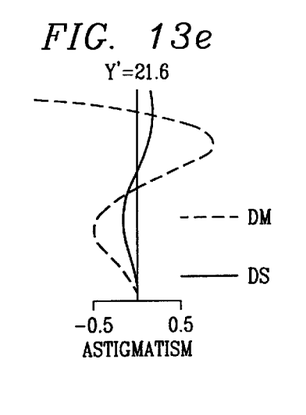
Figure 13F:
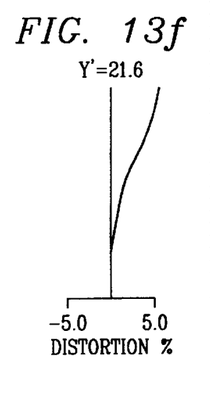
Figure 13G:
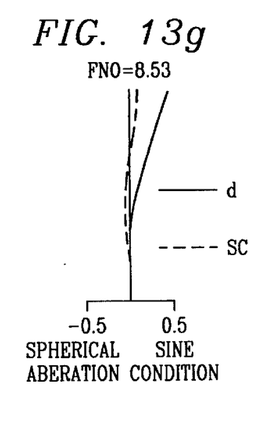
Figure 13H:
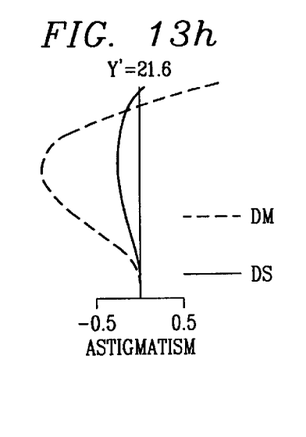
Figure 13I:
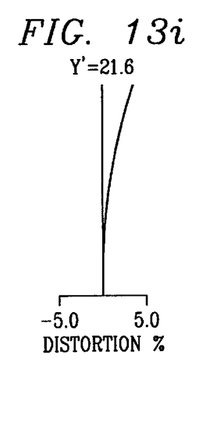

Hereinafter, the construction of a zoom lens system obtained by the designing method according to the present invention will be more concretely described with reference to construction data and graphical representations of aberrations. First and second examples correspond to the above-described embodiment of a zoom lens system (FIG. 3) comprising [a spherical system], [a radial GRIN lens element] and [an aspherical surface]. Each unit is formed of one radial GRIN lens element. FIGS. 10 and 11 are lens construction views of the first and the second examples, respectively, and show the lens arrangement at the wide-angle condition [W]. In the lens construction views, arrows m1 to m3 schematically show the movements of first to third lens units Gr1 to Gr3 from the wide-angle condition [W] to the telephoto condition [T] in zooming, respectively.

In the construction data of each example, ri (i=1, 2, 3, ...) represents the radius of curvature of the ith surface counted from the object side and di (i=1, 2, 3, ...) represents the ith axial distance counted from the object side. Moreover, in the construction data, the axial distance (variable distance) which varies in zooming is the axial distance between units at the wide-angle condition (shortest focal length condition) [W] to the middle condition (middle focal length condition) [M] to the telephoto condition (longest focal length condition) [T]. The focal lengths f and the F-numbers $F_{no}$ of the entire lens system at the focal length conditions [W], [M] and [T] are also shown. The surfaces marked with * at the radius of curvature ri are aspherical and defined by the expression (3) representing the surface configuration of an aspherical surface. The refractive index distribution coefficients $N_i$ of first to third GRIN lens elements (GRIN1 to GRIN3) are the 2ith refractive index distribution coefficients in the expression (1)

TABLE 1

1st Embodiment
F = 35.35~49.395~67.425
Fno. = 4.60~6.00~8.53

| Radius of Curvature | Axial Distance |
|---|---|
| r1* 339.362 | d1 12.771 GRIN1 |
| r2* −15.902 | d2 19.328~15.537~12.712 |
| r3 −17.625 | d3 4.000 GRIN2 |
| r4* 37.098 | |

[Aspherical Coefficient of r1]

$\epsilon$ = 1.000000
A4 = 2.419084 × $10^{-4}$
A6 = 6.003148 × $10^{-7}$
A8 = −4.975216 × $10^{-8}$
A10 = 8.049209 × $10^{10}$
A12 = −5.229846 × $10^{-12}$

[Aspherical Coefficient of r2]

$\epsilon$ = 1.000000
A4 = 7.732985 × $10^{-5}$
A6 = 5.875306 × $10^{-7}$
A8 = −3.061730 × $10^{-8}$
A10 = −1.238868 × $10^{-10}$
A12 = 1.741423 × $10^{-11}$

[Aspherical Coefficient of r4]

$\epsilon$ = 1.000000
A4 = −2.743715 × $10^{-4}$
A6 = 1.855858 × $10^{-6}$
A8 = −1.953651 × $10^{-8}$
A10 = 1.052459 × $10^{-10}$
A12 = 1.633052 × $10^{-13}$

[Refractive Index Distribution Coefficient of GRIN1]

| | | |
|---|---|---|
| N0d = 1.77250 | N0C = 1.76781 | N0F = 1.78333 |
| N1d = 5.1100499 × $10^{-4}$ | N1C = 5.0226358 × $10^{-4}$ | N1F = 5.3287161 × $10^{-4}$ |
| N2d = −1.4119850 × $10^{-5}$ | N2C = −1,4119850 × $10^{-5}$ | N2F = 1.4119850 × $10^{-5}$ |
| N3d = −1.2578010 × $10^{-8}$ | N3C = −1.2578000 × $10^{-8}$ | N3F = −1.2578000 × $10^{-8}$ |
| N4d = 2.7685556 × $10^{-10}$ | N4C = 2,7685556 × $10^{-10}$ | N4F = 2.7685556 × $10^{-10}$ |

TABLE 1-continued

1st Embodiment
F = 35.35~49.395~67.425
Fno. = 4.60~6.00~8.53

[Refractive Index Distribution Coefficient of GRIN2]

| | | |
|---|---|---|
| N0d = 1.5168 | N0C = 1.51432 | N0F = 1.52237 |
| N1d = 5.3808011 × $10^{-4}$ | N1C = 5.3575456 × $10^{-4}$ | N1F = 5.4522546 × $10^{-4}$ |
| N2d = 2.5868273 × $10^{-5}$ | N2C = 2.5868263 × $10^{-5}$ | N2F = 2.5828263 × $10^{-5}$ |
| N3d = −9.4117797 × $10^{-9}$ | N3C = −9.4117797 × $10^{-9}$ | N3F = −9.4117797 × $10^{-8}$ |
| N4d = −4.8052805 × $10^{-10}$ | N4C = −4.8052805 × $10^{-10}$ | N4F = −4.8052805 × $10^{-10}$ |

TABLE 2

2nd embodiment
f = 39.0~75.6~133.2
Fno = 3.60~4.00~8.73

| Radius of Curvature | Axial Distance |
|---|---|
| r1* 19.236 | d1 3.376 GRIN1 |
| r2* 31.690 | d2 3.826~15.158~22.338 |
| r3* −38.660 | d3 10.371 GRIN2 |
| r4* −13.723 | d4 25.419~14.673~8.500 |
| r5* −14.854 | d5 2.500 GRIN3 |
| r6* −143.032[tz,1/32 | |

[Aspherical Coefficient of r1]

$\epsilon$ = 1.000000
A4 = −0.11101 × $10^{-4}$
A6 = −0.31213 × $10^{-7}$
A8 = −0.25714 × $10^{-9}$
A10 = −0.21090 × $10^{-11}$
A12 = −0.10704 × $10^{-13}$

[Aspherical Coefficient of r2]

$\epsilon$ = 1.000000
A4 = −0.92959 × $10^{-5}$
A6 = −0.70696 × $10^{-7}$
A8 = −0.71400 × $10^{-9}$
A10 = −0.25534 × $10^{-11}$
A12 = 0.22470 × $10^{-13}$

[Aspherical Coefficient of r3]

$\epsilon$ = 1.000000
A4 = −0.72892 × $10^{-4}$
A6 = 0.18671 × $10^{-6}$
A8 = −0.10447 × $10^{-7}$
A10 = 0.21617 × $10^{-9}$
A12 = −0.19349 × $10^{-11}$

[Aspherical Coefficient of r4]

$\epsilon$ = 1.000000
A4 = −0.79424 × $10^{-5}$
A6 = −0.25155 × $10^{-6}$
A8 = −0.19348 × $10^{-8}$
A10 = −0.59649 × $10^{-10}$
A12 = 0.11942 × $10^{-11}$

[Aspherical Coefficient of r5]

$\epsilon$ = 1.000000
A4 = 0.14140 × $10^{-3}$
A6 = −0.34045 × $10^{-6}$
A8 = 0.16645 × $10^{-8}$
A10 = −0.11636 × $10^{-10}$
A12 = 0.53017 × $10^{-13}$

[Aspherical Coefficient of r6]

$\epsilon$ = 1.000000
A4 = 0.33472 × $10^{-5}$
A6 = 0.12069 × $10^{-6}$

TABLE 2-continued

2nd embodiment
f = 39.0~75.6~133.2
Fno = 3.60~4.00~8.73

$A8 = 0.44230 \times 10^{-9}$
$A10 = -0.16035 \times 10^{-11}$
$A12 = 0.31384 \times 10^{-14}$ Refractive Index Distribution Coefficient of GRIN1]

| | | |
|---|---|---|
| N0d = 1.77250 | N0C = 1.76781 | N0F = 1.78333 |
| N1d = 8.2780000 × $10^{-4}$ | N1C = 8.1310000 × $10^{-4}$ | N1F = 8.5830000 × $10^{-4}$ |
| N2d = 2,7860000 × $10^{-6}$ | N2C = 2.7690000 × $10^{-6}$ | N2F = 2.9270000 × $10^{-6}$ |
| N3d = 2.0290000 × $10^{-8}$ | N3C = 1.9270000 × $10^{-8}$ | N3F = 2.0320000 × $10^{-8}$ |
| N4d = 1.6150000 × $10^{-10}$ | N4C = 1.6400000 × $10^{-10}$ | N4F = 1.6960000 × $10^{-10}$ |

Refractive Index Distribution Coefficient of GRIN2]

| | | |
|---|---|---|
| N0d = 1.77250 | N0C = 1.76781 | N0F = 1.78333 |
| N1d = 8.9900000 × $10^{-4}$ | N1C = 8.8630000 × $10^{-4}$ | N1F = 9.3140000 × $10^{-4}$ |
| N2d = 5.5890000 × $10^{-6}$ | N2C = 5.5230000 × $10^{-6}$ | N2F = 5.6930000 × $10^{-6}$ |
| N3d = 6.4640000 × $10^{-8}$ | N3C = 6.3480000 × $10^{-8}$ | N3F = 6.9370000 × $10^{-8}$ |
| N4d = 1.0290000 × $10^{-9}$ | N4C = 1.0300000 × $10^{-9}$ | N4F = 1.0040000 × $10^{-9}$ |

[Refractive Index Distribution Coefficient of GRIN3]

| | | |
|---|---|---|
| N0d = 1.51680 | N0C = 1.51431 | N0F = 1.52237 |
| N1d = 1.4040000 × $10^{-3}$ | N1C = 1.4240000 × $10^{-3}$ | N1F = 1.3470000 × $10^{-3}$ |
| N2d = -1.3770000 × $10^{-7}$ | N2C = -4.0950000 × $10^{-7}$ | N2F = 6.3620000 × $10^{-7}$ |
| N3d = 1.9750000 × $10^{-9}$ | N3C = 3.3610000 × $10^{-9}$ | N3F = -1.6410000 × $10^{-9}$ |
| N4d = -1.5970000 × $10^{-11}$ | N4C = -1.8450000 × $10^{-11}$ | N4F = -1.0150000 × $10^{-11}$ |

The first example is a two-unit zoom lens system comprising from the object side a first lens unit Gr1 having a positive optical power and a second lens unit Gr2 having a negative optical power, wherein zooming is performed by varying the unit-unit distances. The first lens unit Gr1 and the second lens unit Gr2 are each formed of one GRIN lens element. A first GRIN lens element (GRIN1) constituting the first lens unit Gr1 is a bi-convex lens element. A second GRIN lens element (GRIN2) constituting the second lens unit GR2 is a bi-concave lens element. The both side surfaces of the bi-convex lens element (GRIN1) and the image side surface of the biconcave lens element (GRIN2) are aspherical.

The second example is a three-unit zoom lens system comprising from the object side a first lens unit Gr1 having a positive optical power, a second lens unit Gr2 having a positive optical power and a third lens unit Gr3 having a negative optical power, wherein zooming is performed by varying the unit-unit distances. The first to the third lens units Gr1 to Gr3 are each formed of one GRIN lens element which is bi-aspherical. A first GRIN lens element (GRIN1) constituting the first lens unit Gr1 is a positive meniscus lens element convex to the object side. A second GRIN lens element (GRIN2) constituting the second lens unit Gr2 is a positive meniscus lens element convex to the image side. A third GRIN lens element (GRIN3) constituting the third lens unit Gr3 is a negative meniscus lens element concave to the object side.

FIGS. 12a to 12i and 13a to 13i are graphic representations of aberrations of the first and the second examples. Of these figures, FIGS. 12a to 12c and 13a to 13c show aberrations at the wide-angle condition, FIGS. 12d to 12f and 13d to 13f show aberrations at the middle condition, and FIGS. 12g to 12i and 13g to 13i show aberrations at the telephoto condition. FIGS. 12a, 12d, 12g, 13a, 13d and 13g show spherical aberration (solid line d) and sine condition (broken line 5C) to the d-line. FIGS. 12b, 12e, 12h, 13b, 13e and 13h show astigmatism (the broken line DM and the solid line DS represent astigmatisms to the d-line on the meridional image plane and on the sagittal image plane, respectively). FIGS. 12c, 12f, 12i, 13c, 13f and 13i show distortion (Y' is an image height).

As described above, according to the method of the present invention, a compact zoom optical system comprising a smaller number of elements than conventional zoom optical systems can be designed.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A method of designing a zoom optical system which includes a plurality of zoom units wherein each zoom unit is formed of one optical element, the method comprising the steps of:

selecting for each zoom unit a first system from the group consisting of a spherical system and an aspherical system, selecting a second system from the group consisting of a gradient index system and a diffractive optical system, and selecting at least a third system from the group consisting of an aspherical system and a diffractive optical system, the first, second and at least third systems constituting a degree of design freedom of each zoom unit;

optimizing each zoom unit by minimizing third-order aberrations and chromatic aberration thereby obtaining an optical design solution for a respective zoom unit; and using the optical design solutions thus obtained by said optimizing step as design start data to design the zoom optical system.

2. A method as claimed in claim 1, wherein a spherical system, a gradient index system and an aspherical system are selected for the first, second and at least third systems at said selecting step.

3. A method as claimed in claim 1, wherein a spherical system, a gradient index system and a diffractive optical system are selected for the first, second and at least third systems at said selecting step.

4. A method as claimed in claim 1, wherein a spherical system, a diffractive optical system and an aspherical system are selected for the first, second and at least third systems at said selecting step.

5. A method as claimed in claim 1, wherein a spherical system, a diffractive optical system and a diffractive optical system are selected for the first, second and at least third systems at said selecting step.

6. A method as claimed in claim 1, wherein said gradient index system has radial gradient index distribution.

7. A method as claimed in claim 1, wherein third-order aberrations are optimized by optimizing an intrinsic coefficient of each zoom unit at said optimization step.

8. A method as claimed in claim 1, wherein chromatic aberrations are optimized so as to satisfy the following condition:

$$PAC \equiv BF(\lambda) - BF(d) = 0$$

where

PAC is the axial chromatic aberration,

BF($\lambda$) is the back focal length of a zoom unit at each wavelength $\lambda$; and BF(d) is the back focal length of the zoom unit at the d-line.

9. A method as claimed in claim 1, wherein a gradient index system satisfies the following condition, when a gradient index system is selected as one of the systems constituting the degree of design freedom of each zoom unit:

$$N_0 > \frac{1}{|PT|}$$

where $N_0$ is an axial refractive index of the gradient index system, and PT is a Petzval sum of the gradient index system.

10. A product produced by the method of designing a zoom optical system which includes a plurality of zoom units wherein each zoom unit is formed of one optical element comprising the steps of:

selecting for each zoom unit a first system from the group consisting of a spherical system and an aspherical system, selecting a second system from the group consisting of a gradient index system and a diffractive optical system, and selecting at least a third system from the group consisting of an aspherical system and a diffractive optical system, the first, second and at least third systems constituting a degree of design freedom of each zoom unit;

optimizing each zoom unit by minimizing third-order aberrations and chromatic aberration thereby obtaining an optical design solution for a respective zoom unit; and using the optical design solutions thus obtained by said optimizing step as design start data to design the zoom optical system.

11. A method of designing a zoom optical system which includes a plurality of zoom units wherein each zoom unit is formed of one optical element, the method comprising the steps of:

selecting for each zoom unit at least three systems including a first system and a second system selected from the group including a spherical system, a gradient index system, and a diffractive optical system, said first and second systems being different, and a third system that is a diffractive optical system or an aspherical system, the first, second and third systems constituting a degree of design freedom of each zoom unit;

optimizing each zoom unit by minimizing third-order aberrations and chromatic aberration thereby obtaining an optical design solution for a respective zoom unit; and using the optical design solutions thus obtained by said optimizing step as design start data to design the zoom optical system.

12. A method as claimed in claim 11, wherein said first, second and third systems selected are a spherical system, a gradient index system and an aspherical system.

13. A method as claimed in claim 11, wherein said first, second and third systems selected are a spherical system, a gradient index system and a diffractive optical system.

14. A method as claimed in claim 11, wherein said first, second and third systems selected are a spherical system, a diffractive optical system and an aspherical system.

15. A method as claimed in claim 11, wherein said first, second and third systems selected are a spherical system, a diffractive optical system and a diffractive optical system.

16. A method as claimed in claim 11, wherein said gradient index system has radial gradient index distribution.

17. A method as claimed in claim 11, wherein third order aberrations are optimized by optimizing an intrinsic coefficient of each zoom unit at said optimization step.

18. A product produced by the method of designing a zoom optical system which includes a plurality of zoom units wherein each zoom unit is formed of one optical element, the method comprising the steps of:

selecting for each zoom unit at least three systems including a first system and a second system selected from the group including a spherical system, a gradient index system, and a diffractive optical system, said first and second systems being different, and a third system that is a diffractive optical system or an aspherical system, the first, second and third systems constituting a degree of design freedom of each zoom unit;

optimizing each zoom unit by minimizing third-order aberrations and chromatic aberration thereby obtaining an optical design solution for a respective zoom unit; and using the optical design solutions thus obtained by said optimizing step as design start data to design the zoom optical system.

19. A zoom optical system, comprising:

a plurality of zoom units, wherein each zoom unit is formed of one optical element, wherein the zoom optical system is designed from design start data which was obtained by having optimized each zoom unit by minimizing third-order aberrations and chromatic aberration by selecting, for each zoom unit, at least three systems including a first system and a second system selected from the group including a spherical system, a gradient index system, and a diffractive optical system, said first and second systems being different, and a third system that is a diffractive optical system or an aspherical system, the first, second and third systems constituting a degree of design freedom of each zoom unit.

20. A zoom optical system of claim 19 wherein said first, second and third systems include a spherical system, a gradient index system and an aspherical system.

21. A zoom optical system of claim 19 wherein said first, second and third systems include a spherical system, a gradient index system and a diffractive optical system.

22. A zoom optical system of claim 19 wherein said first, second and third systems include a spherical system, a diffractive optical system and an aspherical system.

23. A zoom optical system of claim 19 wherein said first, second and third systems include a spherical system, a first diffractive optical system and a second diffractive optical system.

* * * * *